United States Patent [19]

Tenhagen

[11] Patent Number: 4,714,574
[45] Date of Patent: Dec. 22, 1987

[54] PROCESS FOR MAKING POLYURETHANE FOAM

[75] Inventor: Rudolf J. Tenhagen, Longirod, Switzerland

[73] Assignee: BP Chemicals Limited, London, England

[21] Appl. No.: 468,058

[22] PCT Filed: Jun. 24, 1982

[86] PCT No.: PCT/GB82/00185
§ 371 Date: Feb. 9, 1983
§ 102(e) Date: Feb. 9, 1983

[87] PCT Pub. No.: WO83/00117
PCT Pub. Date: Jan. 20, 1983

[30] Foreign Application Priority Data
Jun. 27, 1981 [GB] United Kingdom ............ 8119908

[51] Int. Cl.$^4$ .................................. B29C 67/22
[52] U.S. Cl. ...................... 264/45.1; 264/46.4; 264/46.6; 264/271.1
[58] Field of Search .............. 264/45.1, 46.4, 46.6, 264/46.7, 271.1

[56] References Cited

U.S. PATENT DOCUMENTS

| | | | |
|---|---|---|---|
| 3,229,441 | 1/1966 | Heffner | 264/46.6 X |
| 3,366,718 | 1/1968 | Komada | 264/46.7 X |
| 3,534,129 | 10/1970 | Bartel | 264/45.1 |
| 3,872,199 | 3/1975 | Ottinger | 264/46.6 |
| 3,929,948 | 12/1975 | Welch | 264/46.4 X |
| 4,190,697 | 2/1980 | Ahrens | 264/46.4 |
| 4,246,213 | 1/1981 | Takamatsu et al. | 264/46.4 X |

FOREIGN PATENT DOCUMENTS 1229790 4/1971 United Kingdom .

Primary Examiner—Philip Anderson
Attorney, Agent, or Firm—Brooks Haidt Haffner & Delahunty

[57] ABSTRACT

A flexible polyurethane foam article with regions of different hardness is made by introducing into a mould a foam formulation giving a foam of a given hardness and then introducing a foam formulation giving a foam of different hardness directly onto the first foam formulation at a time corresponding to a volume expansion in the range 100% to 2300%.

17 Claims, 6 Drawing Figures

PROCESS FOR MAKING POLYURETHANE FOAM

The present invention relates to the production of foams which contain integrated foam areas having higher or lower hardnesses. Such foams are particularly useful for seats.

Seats, especially car seats have to support the seated person under static and dynamic conditions in a way that the supporting force is compatibly distributed on to the human body. This means, that the main force is taken by the bones without squeezing the veins in the softer areas. In addition to this a seat needs to provide sufficient side stability in case of side acceleration which exists when driving the car in curves.

It is therefore desirable for seats in particular for use in transport, e.g. car seats, to have relatively hard and relatively soft portions. Those skilled in the art of seat construction are familiar with the parts of the seat where it is desired to provide relatively hard portions.

It is well-known that seats may be made from polyurethane foams. Reinforced regions in such polyurethane foams are at present provided in a number of ways. One method is to prepare a foam part of increased hardness and to introduce this separately prepared part into the softer foam part. Another method is to embed steel wire frame inserts into the seat. A third method is for the supporting seat frame, to which the polyurethane foam is attached, to provide additional support in the required areas.

In addition to the above commercially use methods, polyurethane foam seats have been produced on an experimental basis by two methods. In one method a first moulding step is carried out to produce a layer of soft foam between two mould parts.

One of the mould parts is then removed and replaced by another mould part which defines a cavity containing the soft foam layer. A mixture giving a harder polyurethane foam is then injected into the cavity.

Another method which had been tried experimentally is to use two separate machines for producing polyurethane foam which feed simultaneously into the mould. It is then necessary to have a mould design or separating walls which keeps the two different foam mixtures substantially apart but which allows sufficient contact between the two foams to ensure good bonding on curing.

Any kind of insert which needs to be put into the moulds during foam seat production requires processing time, adds material cost and increases repair and scrap rates.

Structural modification of the seat frame is limited and again adds production cost.

The new experimental processes described above require complicated and more costly moulds (two lids) and need double processing time or are either investment intensive or limited in hardness variation.

Furthermore it is required to have some kind of separating walls in the mould which keep the liquid material for a short time in place.

The production of foam articles of different hardness without devices within the mould to separate the harder and softer foams is disclosed in Canadian Patent Specification and German Patent Specification. In the processes described above in these two specifications formulations giving harder and softer foams are poured simultaneously into the mould. The Canadian specification on page emphasises the importance of providing grooves and depressions in the mould so that the different foam formulations are kept separate initially even though they are subsequently allowed to come into contact with each other. In the moulding process specifically described in the German patent specification a mixture producing harder foam is introduced into a recess in a mould corresponding to the side portions of the seat while a mixture producing softer foam is fed into the centre of the mould. The new foam formulations are again kept apart initially. The requirement for the foam formulations to be fed into the moulds in which they are initially separated imposes restrictions on the types of mould which can be used.

Furthermore, it is only possible to produce articles in which the regions of harder and softer foam extend to the surface of the article. It would be desirable to be able to produce articles of harder and softer foams in which one type of foam extended over a substantial part of the other type of foam. For example, this would make possible production of seats in which the surface layer had a desirable soft feel but regions of harder foam were embedded within the car seat. The car seats disclosed in Canadian Pat. No. 789958 and German patent specification No. 2523527, in which upwardly projecting side portions consisting only of harder foam are joined to a central portion of softer foam have the disadvantage that when a person sits on the central portion and depresses it there is a tendency for the harder foam portions to be deflected inwards towards the centre of the seat, which is undesirable. This tendency for the side portions to be deflected inwards can be reduced if a region of harder foam embedded in the softer foam extends into the central portion between the upwardly projecting side portions. Until now there has been no simple way of making such car seats.

According to the present invention the process for the production of a flexible polyurethane foam article having regions of differing hardness comprises introducing into a mould first and second foam fomulations giving foams of different hardness prepared by mixing together a polyol stream and an isocyanate stream in a mixer characterised in that the second foam formulation in introduced directly on to the first formulation at a time corresponding to a volume expansion of the first foam formulation in the range +100% to 2300%.

The term "foam formulation" means, as is well-known to those skilled in this technology, the total mixture of ingredients required to give a flexible polyurethane foam.

The volume expansion of the foam formulation can be observed by feeding the foam formulation into a container and measuring the height of the foam at different times so enabling the time required for a given volume expansion to be determined.

The foam ingredients are usually fed into the mould through one or more nozzles which are moved across the mould so that the foam formulation will be introduced into different parts of the mould at different times although the time interval between the beginning and end of the introduction of the foam formulation is preferably kept as short as possible. The time of first introduction of the second foam formulation is such as to correspond to a foam expansion in the first foam formulation at the point at which the second formulation is introduced of at least +100%. Preferably any subsequent addition of the second formulation is made at a time corresponding to at least 100% foam expansion of the first foam formulation at the point at which the second foam formulation is added.

Various techniques have been disclosed previously for producing polyurethane foam formulations of different hardness for making articles such as car seats. In Canadian Pat. No. 789958 the increased hardness in the side portions is provided by adding a dense filler to the formulation intended to give the harder polyurethane. This however is not a very satisfactory technique.

It is possible to vary the hardness of a polyurethane foam by varying the ratio of isocyanate index which is a well-known measure of the relative amounts of isocyanate polyol used to make it. The variation in hardness which can be obtained by this method is limited however.

It is possible to vary the amount of water used in the foam formulation so as to give a less fully expanded foam of higher density which therefore feels harder. However in the production of foam articles having regions of harder and softer foam it is preferred that the regions of increased hardness are composed of foams which are inherently harder than the softer foams rather than foams which are only harder by reason of having a higher density.

The different foam formulations can be prepared in various different ways. The final stage in the production of polyurethane foams is the mixing together of a polyol, usually a polyether polyol, and an isocyanate. This is done in a mixing device which then discharges the mixture into the place where it is to be foamed.

It is particularly preferred to carry out the process of the present invention using a foam formulations in which the formulations giving softer and harder foams differ in their content of any one or more of:
1. isocyanate with a functionality greater than two, i.e. with more tha two isocyanate groups per molecule, e.g. polyphenylmethylene polyisocyanate
2. active hydrogen containing compound which may be
   (a) chain extender
   (b) cross-linker.

An increase in the proportion of isocyanate with a functionality greater than two i.e. with more than two isocyanate groups per molecule, e.g. polyphenyl methylene polyisocyanate and/or cross-linker will cause to an increase in hardness.

An increase in the proportion of chain extender will cause a decrease in hardness.

The formulations of different hardness may be made using a mixture containing polyol which has been prepared in bulk in advance so as to contain differing amounts of cross-linker or chain extender. Similarly an isocyanate feed can be used which have been prepared in bulk in advance so as to contain differing amounts of polyphenyl methylene polyisocyanate.

However it is more convenient for the manufacture of polyurethane foams to use a single main polyol feedstock and a single main isocyanate feedstock. The foam manufacturer may then be able to obtain such main feedstocks already prepared for use from his suppliers, which will simplify his manufacturing process.

It is a feature of the invention that the foam formulations giving harder and softer foam can be prepared from a main isocyanate stream and a main polyol stream. The necessary changes in hardness are then obtained by introducing an additive when required into the mixing device or a stream flowing to the mixing device. Thus the polyol stream can be formulated to give a relatively hard foam with the isocyanate used, and a chain extender may be fed into the mixing device, either directly or by addition to the main polyol stream, to give a formulation giving softer foam.

Conversely the main polyol stream may be one which gives with the isocyanate used a relatively soft foam. A cross linker may then be added, in the same way as the chain extender mentioned above, to give a harder foam.

Similarly an isocyanate stream containing more or less polyphenyl methylene polyisocyanate may be used in addition to the main isocyanate stream to adjust the hardness of the foam.

It is desirable to control the relative reactivity of the two foam formulations used to obtain relatively hard and soft parts.

The first formulation fed to the mould is preferably less reactive than the second formulation fed to the mould.

Preferably the second formulation has a cream time which is at least $t-1$ seconds (where t is the cream time in seconds of the first formulation) more preferably at least $t-2$ seconds.

The first formulation fed to the mould preferably has a cream time in the range 2 to 7 seconds.

Cream time is defined as the time in seconds from the time of mixing the foam-forming ingredients and the onset of creaming which is a colour change from clear to milky which takes place when the liquid begins to expand.

Cream time can be affected by the nature of the polyol and isocyanate used and by the nature and amount of catalyst used and those skilled in the formulation of polyurethane will readily understand how to obtain suitable cream times.

The second formulation is introduced directly on to the first formulation (i.e. in the absence of any separating device), at a time corresponding to a volume expansion of the first foam formulation in the range +100% to 2300%. Preferably the second foam formulation is first introduced at a time corresponding to a volume expansion of the first foam formulation in the range +250% to +1400% The second formulation is preferably first introduced into the mould at a time between $t+3$ seconds and $t+15$ seconds (where t is the cream time of the first formulation) after the introduction of the first formulation has begun more preferably $t+3$ to $t+7$ seconds.

The pre-polymer technique can be used in which the polyol is reacted with an excess of polyisocyanate to give a pre-polymer which is foamed in a second step by the action of a blowing agent, usually water. Alternatively the one shot technique may be used in which reaction of the polyol and isocyanate and the foaming reaction take place in a single step.

The present invention will now be further described by reference to the following drawings, which are not to be deemed limitative of the present invention in any manner thereof.

FIG. 1 shows the addition into the mold of a first foam formulation through nozzle 1, which is for adding the first foam formulation into the mold. Also shown in FIG. 1 is nozzle 2 which is for adding a second foam formulation into the mold.

Figure 1:
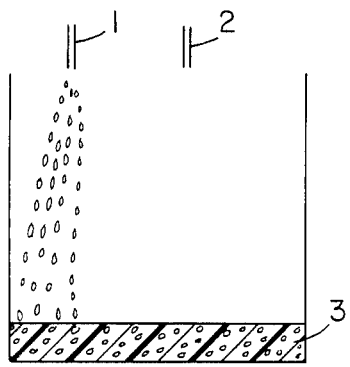
FIG. 1 shows the addition of a first foam formulation.

In FIG. 1 a measured amount of the first foam formulation 3 is added to the bottom of the mold. This first foam formulation 3 is introduced in a liquid form. Within a very few seconds, the reaction between the polyol component and the isocyanate component of the reaction mixture begins, and causes the material in the mold to expand.

Figure 2:
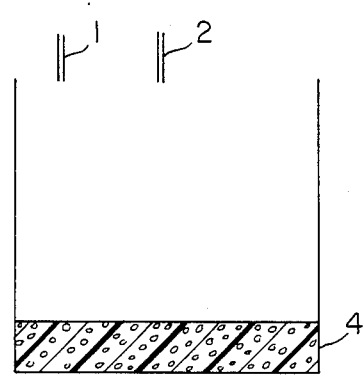
FIG. 2 shows the initial foaming of the first foam formulation.
Figure 3:
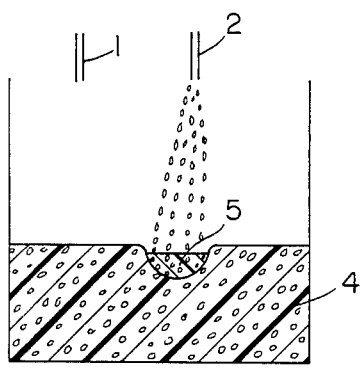
FIG. 3 shows the addition of a second foam formulation.

The expansion of the first foam formulation will produce the first foam 4, which is a soft foam, and is shown in FIG. 2. The expanding soft first foam continues to expand, and to increase in volume, as shown progressively by the successive increases in the volume of foam 4 in FIGS. 2, 3, 4, 5 and 6. In other words, FIG. 2 shows the initial foaming of the soft first foam formulation.

At a time corresponding to a volume expansion for the soft first foam formulation, in the range of +100% to +2300%, the addition of the second foam formulation 5 through nozzle 2 onto a portion of the top surface of the first foam 4 takes place.

Figure 4:
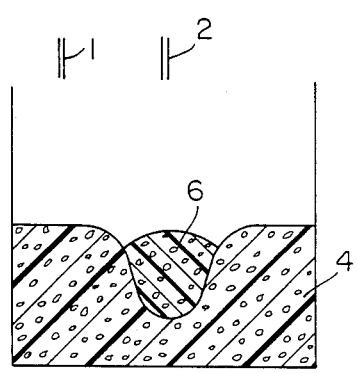
FIGS. 4 and 5 show the encapsulation of the second foam by the first foam.
Figure 5:
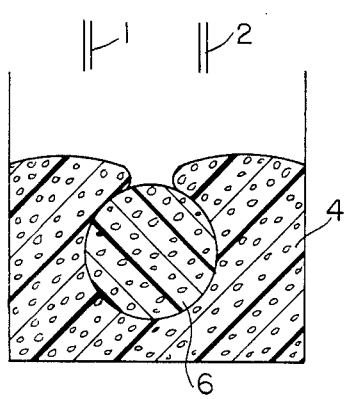
Figure 6:
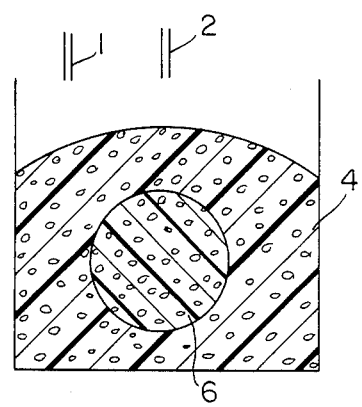
FIG. 6 shows the encapsulated second foam after foaming is completed.

FIGS. 4 and 5 show that there is an encapsulation of the second or firm foam 6 taking place by the soft first foam 4. The second foam formulation 5 of FIG. 3 starts expanding in order to produce the hard foam 6 which is shown in FIGS. 4, 5 and 6. THe second or firm hard foam 6 is harder and firmer than the soft first formulation 4, even though the second foam formulation 6 continues to expand and to progressively increase in volume as shown sequentially in FIGS. 4, 5 and 6.

As can be seen from FIGS. 4, 5 and 6, the soft first foam 4 continues to expand at such a rate that it will eventually surround and encapsulate the second hard foam, after the foaming has been completed. Thus, FIG. 6 shows the encapsulated second foam which is surrounded by, and embedded within, the first soft foam, after the foaming has been completed by both foams 4 and 6.

In summary, the second foam formulation is introduced directly on to a portion of the first formulation, at a time corresponding to a volume expansion of the first foam formulation in the range +100% to +2300%. The time of this volume expansion of the first foam formulation occurs in at least the cream stage but before the tacky stage. The second foam formulation settles within a cavity in the first foam formulation. The first foam formulation is foaming, and continues to foam, and to expand at a rate greater than the rate of foaming expansion of the second foaming formulation, so that the first foaming formulation flows over and around the second foaming formulation, so as to form one or more relatively hard regions embedded within and surrounded by the relatively soft foam.

THE POLYOL

In producing cellular urethane polymers the reaction mixture or foam formulation contains an active hydrogen-containing organic compound having an average of at least two and usually not more than six active hydrogen atoms present as hydroxyl groups. Such organic polyol reactants include compounds consisting of carbon, hydrogen and oxygen as well as compounds which contain these elements in combination with phosphorus, halogen and/or nitrogen. Suitable classes of organic polyol reactants for use in the method of this invention are polyether polyols, polyester polyols, polyactone polyols, nitrogen-containing polyols, phosphorus-containing polyols, phenolic-based polyols, and polymer/polyols produced by polymerising an ethylenically unsaturated monomer in one of the aforesaid polyols in the presence of a free radical initiator, or reacting isocyanates with primary and/or secondary amino groups containing polyaminesand/or hyrazines in presence of above mentioned polyols, as described in the German Offenlegungsschrift No. 25 19 044 (4.11.76).

It is well known to the polyurethane art that the particular polyol reactant or combination of polyols employed depends upon the end-use of the polyurethane product.

For this purpose the polyol is usually characterised by its hydroxyl number which is determined by and defined as the number of milligrams potassium hydroxide required for the complete neutralisation of the hydrolysis product prepared by hydrolysing an ester derived from 1 g of polyol or mixture of polyols. The hydroxyl number is also defined by the following equation which reflects its relationship with the functionality and molecular weight of the polyol.

$$OH = \frac{56.1 \times 1000 \times f}{M.W.}$$

OH = hydroxyl number of polyol
f = average functionality, that is, average number of hydroxyl groups per molecule of polyol
M.W = average molecular weight of the polyol.

Examples of preferred polyols are those in which at least 40 weight percent of the total polyol content is constituted of a polyether triol having the following additional characteristics: (a) an average primary hydroxyl content of at least 40 mole percent (or no more than 60 mole percent of the less reactive secondary hydroxyl groups); and (b) an average molecular weight of from about 2000 to about 8000. Preferably, such polyether triols for use as components of high-resilience formulations contain from about 60 to about 90 mole percent of primary hydroxyl groups and have an average molecular weight of from about 4000 to 7000. Consistent with their trifunctionality and the aforesaid respective ranges of molecular weights, such polyether triols have hydroxyl numbers from 84 to 21, perferably from 42 to 24. These highly reactive polyether triols are provided by oxyalkylation of one of the aforesaid trihydric starters such as glycerol, with propylene oxide and ethylene oxide. Usually, the total ethylene oxide content of the polyether triols is between about 7 and about 20 weight percent, expressed on the basis of total alkylene oxide fed during the oxyalkylation reaction. The high primary hydroxyl content is introduced by capping of the polyoxyalkylene chains with at least a portion of the total ethylene oxide feed.

In providing high resilience foams, the polyether triols may be used as essentially the sole type of polyol in the formulation or they may be employed in combination with other polyols to control the degree of softness or firmness of the foam to vary the load bearing properties.

In particular the polyol used may contain finely dispersed organic or inorganic materials to provide improved load bearing properties. Examples of such polyols are those prepared by polymerising ethylenically unsaturated monomers e.g. acrylonitrile andor styrene with a polyether polyol. The polyether polyol in which the polymerisation takes place preferably has the characteristics indicated as preferred for polyether triols above.

The products obtained by polymerising ethylenically unsaturated monomers in polyether polyols are frequently known as polymer polyols.

THE ISOCYANATE

The polyisocyanate components employed in this invention for mixing with active hydrogen compounds preferably are those having the general formula:

$$Q(NCO)_i$$

wherein i is an integer of two or more and Q is an organic radical having the valence of i. Q can be a substituted or unsubstituted hydrocarbon group (e.g. an alkylene or an arylene group). Q can be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diisocyanate, 1,8-diisocyanato-p-menthane, xylene diisocyanate, (OCNCH$_2$CH$_2$OCH$_2$)$_2$0,1-methyl-2.4-diisocyanatocyclohexane, phenylene diisocyanate, tolylene diisocyanates, chlorophenylene diisocyanates, diphenylmethane-4.4'-diisocyanate, naphthalene-1.5-diisocyanate, triphenylmethane-4.4',4"-triisocyanate, and isopropylbenzenealpha4-diisocyanate.

Q can also represent a polyurethane radical having a valence or i in which case Q(NCO)$_i$ is a composition conventionally known as a pre-polymer. Such prepolymers are formed by reacting a stoichiometric excess of a polyisocyanate as set forth hereinbefore and hereinafter with an active hydrogen-containing component as set forth hereinafter, especially the polyhydroxyl containing materials or polyols.

Further included among the isocyanates useful in this invention are the dimers and trimers of isocyanates and diisocyanates and polymeric diisocyanates such as those having the general formula:

$$[Q''(NCO)_i]_j$$

in which i and j are each integers of two or more, and Q'' is a polyfunctional organic radical, and/or, as additional compontents in the mixtures, compounds of the general formula:

$$L(NCO)_i$$

in which i is one or more and L is a monofunctional or polyfunctional atom or radical. Examples of this type include ethylphosphonic diisocyanate, C$_2$H$_5$P(O)-N(NCO)$_2$; isocyanates derived from sulfonamides (QSO$_2$NCO), cyanic acid, and thiocyanic acid.

More specifically, the polyisocyanate component employed in this invention also include the following specific compounds as well as mixture of two or more of them; 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of aniline formaldehyde condensation products, dianisidine diisocyanate, toluidine diisocyanate, xylylene diisocyanate, bis(2-isocyanatoethyl)fumarate, bis(2-isocyanatoethyl)carbonate, 1,6-hexamethylene-diisocyanate, 1,4-tetramethylene-diisocyanate, 1,10-decamethylene-diisocyanate, cumene-2,4-diisocyanate, 4-methoxy-1,3-phenylene-diisocyanate, 4-chloro-1.3-phenylenediisocyanate, 4-bromo-1,3-phenylenediisocyanate, 2-ethoxyll, 3phenylenediisocyanate, 2,4'-diisocyanatodiphenylether, 5,6-dimethyl 1,3-phenylenediisocyanate, 4,4'-diisocyanatodiphenylether, bis-5,6-)2-isocyanatoethyl)(bicyclo 2.2.1)hept-2-ene, benzidenediisocyanate, 4,6-dimethyl-1,3 phenylene 9.10-anthracenediisocyanate, 4,4'-diisocyanatodibenzyl, 3,3-dimethyl-4.4'diisocyanatodiphenylmethane, 2,6-dimethyl-4,4'diisocyanatodiphenyl, 2,4-diisocyanatostilbene, 3,3'-dimethoxy-4,4'diisocyanatodiphenyl, 1,4-anthracene diisocyanate, 2,5-fluorenediisocyanate, 1,8-naphthalene diisocyanate, 2,6-diisocyanatobenzfuran, 2,4,6-toluene triisocyanate, and many other organic polyisocyanates that are known in the art, such as those that are disclosed in an article by Siefken, Ann. 562, 75 (1949). It is particularly preferred to use 2,4- and 2,6-toluene diisocyanate, particularly mixtures of the above isomers, and polyphenyl methylene polyisocyanates. An increase in the relative amount of toluene isocyanates gives softer foam and an increase in the relative amount of isocyanate with a functionality greater than two i.e. with more than two isocyanate groups per molecule, e.g. polyphenyl methylene polyisocyanates gives harder foam.

BLOWING AGENTS

Water and/or readily volatile organic substances are used as blowing agents in the process according to the invention.

Generally, the blowing agent is employed in an amount from about 1 to about 15 parts by weight per 100 parts by weight of total polyol reactant, the particular blowing agent and amount thereof depending upon the type of foam product desired. Flexible foam formulations usually contain no more than about 6 pphp of water. The selection and amount of blowing agent in any particular foam formulation is well within the skill of the cellular polyurethane art. Suitable organic blowing agents are e.g. acetone, ethyl acetate, halogenated alkanes, such as methylene chloride, chloroform, ethylidene chloride, vinylidene chloride, monofluorotrichloromethane, chlorofluoromethane or dichlorodifluoromethane, butane, hexane, heptane or diethyl ether. A blowing effect can also be obtained by adding compound which decompose at temperatures above room temperature to liberate gases, e.g. azo compounds such as azoisobutyric acid nitrile which liberate nitrogen. Further examples of blowing agents and details of the use of blowing agents may be found in Kunstoff-Handbuch, Volume VII, published by Vieweg and Hoechtlen, Carl-Hanser-Verlag, Munnich 1966 e.g. on pages 108 and 109, 453 and 507 to 510.

CATALYSTS

Catalysts are also frequently used in the process according to the invention. The catalysts used are knwon per se, e.g. tertiary amines such as triethylamine, tributylamine, N-methyl-morpholine, N-ethyl-morpholine-N-Cocomorpholine, N,N,N',N'-tetramethylethylenediamine, 1,4-diaza-bicyclo-(2,2,2)-octane, N-methyl-N'-dimethyl-aminoethyl-piperazine, N,N-dimethyl benzylamine, bis-(N,N-diethylaminoethyl)-adipate, N,N-diethylbenzylamine, pentamethyl diethylenetriamine, N,N-dimethylcyclohexylamine, N,N,N',N'-dimethyl-phenylethylamine, 1.2-dimethyl imidazole and 2-methyl-imidazole, triethylene diamine, bis(2-dimethylamino ethyl)ether.

The tertiary amines which contain hydrogen atoms capable of reacting with isocyanate groups may be e.g. triethanolamine, triisopropanolamine, N-methyldiethanolamine, N-ethyldiethanolamine, N,N-dimethylethanolamine or their reaction products with alkylene oxides such as propylene oxide and/or ethylene oxide.

Silaamines which contain carbon-silicon bonds may also be used as catalysts, e.g. the compounds described in German patent specification No. 1 229 290 such as 2,2,4-trimethyl-2-silamorpholine or 1,3-diethylaminomethyltetramethyl-disiloxane.

The catalysts used may also be bases which contain nitrogen such as tetraalkyl ammonium hydroxides or alkali metal hydroxides such as sodium hydroxide, alkali metal phenolates such as sodium phenolate or alkali metal alcoholates such as sodium ethylene. Hexahydrotriazines may also be used as catalysts.

Organic metal compounds may also be used as catalysts according to the invention, especially organic tin compounds.

The organic tin compounds used are preferably tin (II) salts of carboxylic acids such as tin (II)-acetate, tin (II) octoate, tin (II)-ethylhexonoate and tin (II)-laurate and the dialkyl tin salts of carboxylic acids such as dibutyl tin diacetate, dibutyl tin dilaurate, dibutyl tin maleate or dioctyl tin diacetate.

Other examples of catalysts which may be used for the process according to the invention and details of their mode of action are described in Kunststoff-Handbuch, Volume VII, published by Vieweg and Hoechtlen, Carl-Hanser-Verlag, Munich 1966, e.g. on page 96 and 102.

The catalysts are generally used in a quantity of between 0.002 and 10% by weight, based on the quantity of compounds which contain at least two hydrogen atoms capable of reacting with isocyanates.

ORGANOSILOXANE SURFACTANT

In producing cellular polyurethanes in accordance with the method of this invention, a minor amount of an organosilicone surfactant may also be present as an additional component of the polyurethane-forming reaction mixture. When used such surfactants are usually present in amounts up to about 5 parts by weight per 100 parts by weight of total polyol reactant. Suitable classes of silicone surfactants are the polysiloxane-polyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone to form a comb-like structure. Usually, the polysiloxane blocks are trialkylsiloxy end blocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are the hydrocarbyl groups having from 1 to 12 carbon atoms including alkyl, aryl, aralkyl, bicycloheptyl and halogen substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like. Especially useful as stabilisers of flexible polyether-based polyurethane foams are the block copolymers described in U.S. Pat. No. 3,305,377 and U.S. Pat. No. Re. 27,541. The copolymers of the latter patent contain from 40 to 200 dimethylsiloxy units as essentially the sole type of difunctional unit, and from 15 to 50 weight percent of the oxyalkylene content of the polyoxyalkylene blocks is constituted of oxyethylene.

The process of the present invention is preferably applied to the production of high resilience foams.

Because of the high reactivity of high-resilience foam formulations, the foams are generally self-stabilising and can be obtained without the use of stabilising agents. However, it is usually desirable to include a silicone surfactant as an additional component of such formulations in order to minimise the tendency of the foam to settle and to control cell uniformity. Particularly effective for this purpose are the relatively low molecular weight polyoxyalkylene-polysiloxane block copolymers described and claimed in U.S. Pat. No. 3,741,917. Especially suitable as components of high-resilience formulations are the block copolymers described therein having the formula:

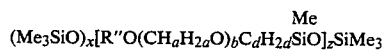

wherein x has an average value of from 2 to 7; b has a value from 3 to 10; z has an average value from 2 to 6; a and d each has a value from 2 to 4; and R" is a monovalent hydrocarbon radical such as alkyl, aralkyl and aryl radicals, or an acyl group Also suitable as organosilicone components of high-resilience foam formulations are the relatively low molecular weight aralkyl-modified polymethylsiloxane oils described and claimed in U.S. Pat. No. 3,839,384.

The organosilicone component is usually present in high-resilience formulations on an amount between about 0.025 and about 2 parts by weight per 100 parts by weight of total polyol.

SOFTNESS CONTROL ADDITIVES

It is possible to describe any compound having two or more active hydrogens as a cross linking agent in so far as it links two shorter polymer chains together by reaction with isocyanate groups. However it is desirable to distinguish between these compounds which cause an increase in the length of a polymer chain and are substantially difunctional and which can be described as chain-extenders and those which certain more than two active hydrogen atoms which cause a significant degree of cross-linking between different polymer chains and are true cross-linkers.

CHAIN EXTENDERS

The softness of the polyurethane foam may be increased by increasing the amount of chain-extenders. Chain extenders are difunctional corresponds containing active hydrogen (i.e. hydrogen which will react with isocyanate groups under the conditions used in foaming) which are difunctional. Examples of suitable compounds containing active hydrogen are compounds containing hydroxyl or amines groups.

It is preferred not to use chain-extenders which react to liberate gas e.g. water as this will lead to changes in the density of the foam. Examples of suitable chain extenders are diols such as ethane diol; butane-1, 2-diol, butane-1, 3-diol, butane-1, 4-diol, hexanediol, diethylene glycol, triethylene glycol, tetraethylene glycol and higher polyglycols preferably having molecular weights in the range 2000 to 3000.

CROSS-LINKERS

The hardness of polyurethane foam may be increased by increasing the amount of cross-linkers. In this specification cross-linkers are compounds containing more than 2 active hydrogen atoms per molecule, preferably more than 3. Examples of such cross-linkers are diethanolamine, triethanolamine, N,N,N',N'-tetrakis-(2-hydroxypropyl)ethylene diamine, and phenol/formaldehyde/aniline condensation products.

The active hydrogen content of the cross-linker or chain extender is preferably relatively high so as to allow a significant effect on hardness to be obtained without requiring an excessive amount of additive. The active hydrogen content may for example correspond to a hydroxyl number as low as 50 particularly when a chain extender is used. The cross-linker or chain extender preferably has an active hydrogen content corresponding to a hydroxyl number of at least 100, more preferably 600 to 1500.

Where the cross linker or chain extender is fed as an additive to the main reaction streams it is preferably used at the rate of 2 to 10 parts by weight per 100 parts of polyol fed in the main polyol stream.

It is possible to use a cross-linker in the polyol formulation giving softer foam, provided that the formulation giving harder foam contains an increased quantity of cross linker and/or contains an isocyanate giving a harder foam. Similarly it is possible to use a chain extender in the polyol giving a harder foam if the formulation giving softer foam contains an increased quantity of chain extender or an isocyanate giving softer foam.

ADDITIONAL INGREDIENTS

It is also sometimes desirable to include various additives in the reaction mixture such as colouring agents, fillers, flame retardants and the like. Suitable colouring agents are, for example carbon black, titanium dioxide, methyl blue, chromium red and the like. Suitable fillers are fatty acids including tall oil fatty acids or tall oil per se, which, if desired, may be halogenated for example, with chlorine or bromine, vermiculite, saw dust, synthetic plastics including vinyl polymers such as, polyvinyl chloride, polystyrene and the like. Suitable flame retardants are antimony oxide, tris(chloroethyl)phosphate, tricresyl phosphate, triphenyl phosphate and the like.

QUANTITIES OF INGREDIENTS

The relative amounts of polyol, isocyanate, water catalyst, surfactant etc used may vary within the ranges usual for conventional polyurethane foams for seating. The isocyanate index used may for example be 90 to 115; more particularly 100 to 112. Preferably the index used in preparing both harder and softer foam is within the range. The isocyanate index is the amount of isocyanate used divided by the theoretically required stoichiometric amount of isocyanate multiped by one hundred.

Polyurethane foams may be made by so-called high resiliency (HR) processes in which any heat necessary to complete the curing reaction is provided by the exothermic heat generated by the curing reaction itself. Seats for cars, etc. are usually made by the HR process, and the process of the present invention is particularly suitable for use in HR processes.

The process of the present invention is preferably used in a process in which the foam ingredients are fed to an open mould which is subsequently closed.

The process of the present invention may be carried out using separate mixing heads for the formulations giving harder and softer foams. Alternatively a single mixing head may be used with separate distributor outlets for the formulations giving harder and softer foams. The distributor outlets may be connected by suitable valves to the single mixing head. A preferred way of carrying out the process of the present invention is use a single mixing head with a single outlet which is caused to move across the area on which foam is to be deposited, and to which is fed a polyol stream and an isocyanate stream and the variations in hardness are obtained by feeding a third stream containing a softness control additive in addition to the polyol and isocyanate streams.

Where defined regions of foam of one hardness surrounded by regions of a different hardness are required as in car seats, the mixer outlet (mixer head) is caused to move in a defined pattern across the open mould and the flow of the third stream of softness control additive is controlled in relation to the movement of the mixer outlet so as to deposit mixture of the required composition in different parts of the mould. Means are preferably provided for doing this automatically.

After the foam has been introduced into the mould it is usually closed and left to allow foaming to take place.

In the embodiment in which the hardness is adjusted by mixing an additive stream with a polyol and an isocyanate an example of the suitable machine is one consisting of at least three metering pumps high or low pressure, for:

(a) polyol,
(b) isocyanate, and
(c) additive, having also a mixer which is a mechanical stirrer or impingement self cleaning mixinghead to homogenize the three metered raw materials before pouring into the mould.

USES

The process of the present invention is particularly useful in the production of the bases of seats for cars and other vehicles where a central soft portion is required with raised portions on either side containing regions of increased hardness. It may also be used to make backs for seats with harder portions to provide support embedded in softer foam, or mattresses or upholstered furniture with harder portions incorporated therein.

The invention will now be illustrated by reference to the following example.

EXAMPLE

A low pressure commercially available machine for introducing polyurethane foam mixture into a mould was used. This machine is commercially available under the name Admiral. In addition to metering pumps for controlling the flow of polyol and isocyanate streams it was provided with an additional pump for feeding a third stream at a controlled rate to the mixing head. Total output from the mixing head was 12 kg/min.

The foams were prepared from the following ingredients:

1. Polyol A is a blend of 40% Polyol A-1 and 60% Polyol A-2

Poly A-1: Polyether polyol produced by addition-polymerising propylene oxide to glycerol and then addition-polymerising ethylene oxide. The content of primary hydroxyl group is 75%, and the hydroxyl number is ca. 34 mg/KOH/g.

Polyol A-2: Grafted polymer polyol prepared by polymerising 20 wt% of acrylonitrile in polyol A-1. The content of primary hydroxyl group is 75%, and the hydroxyl number is ca. 28 mg/KOH/g.

2. Silicone surfactant 1 is a commercially available polyoxyalkylenepolysiloxane block copolymer having a MW of about 500 and having the formula:

$$Me_3SiO(Me_2SiO)_x[R''O(CH_aH_{2a}O)_bC_dH_{2d}SiO]_zSiMe_3$$

(with Me on the Si)

wherein x has an average value of from 2 to 7; b has a value from 3 to 10; z has an average value from 2 to 6; a and d each has a value from 2 to 4; and R'' is a monovalent hydrocarbon radical such as alkyl, aralkyl and aryl radicals, or an acyl group.

3. TDI 80-20 is a mixture of 80% wt 2,4 and 20% 2,6-isomers of toluene diisocyanate which has been purified by distillation.

4. Crude MDI is an unrefined mixture obtained by reacting aniline with formaldehyde and then converting the amino groups to isocyanate.

Three separate streams were fed to the mixing head at various times during the filling of the mould. Stream I was the main polyol stream, and stream II was the isocyanate stream. Together these gave a harder foam. When it was desired to produce a softer foam stream III containing a chain extender, namely water was fed to the mixer.

The composition of the three streams is given in Table 1.

TABLE 1

| | parts by weight in total formulation |
|---|---|
| Stream I | |
| Polyol A | 100 |
| Water | 2.4 |
| Triethylenediamine | 0.35 |
| Bis(2-dimethylamino ethyl) ether | 0.05 |
| Silicone surfactant 1 | 0.8 |
| Stream II | |
| weight % composition of stream | |
| TDI 80-20 | 70 |
| Crude MDI | 30 |
| Parts by weight of stream per 100 parts of polyol A | 33.8 |
| Stream III | |
| weight % composition of stream | |
| Polyol A | 90% |
| Water | 8% |
| Bis(2-dimethyl amino ethyl) ether | 2% |
| Parts by weight of stream per 100 parts of polyol A | 5.0 |
| Mould Type: | |
| Typical automotive front seat mould made from cast aluminium (18,8 l volume). | |
| Conditions | |
| Mould temperature | 50–55° C. |
| Demould time | 8 min. |

(Note the mould temperature corresponds almost to that obtained by the exothermic reaction. The mould was heated externally to 50° C. and the temperature was then controlled by a thermostat).

Processing:
a. Pumps 1/2/3 for streams I/II/III were started and the material poured into the open mould for 3.5 sec from left to right over the inner mould surface.
b. When the mix started creaming (after 4 sec), pumps 1 and 2 for streams I and II were started twice for one second to pour a strip of harder foam mix into each side of the mould first left than right from front to rear.

The mould was then closed and the ready made part demoulded after 8 minutes.

The cream time for the formulation obtained from streams 1, 2 and 3 was 5 seconds.

The cream time for the formulation from streams 1 and 2 was 7 seconds.

The formulation (Streams I and II) giving harder foam was first fed onto the mixture giving the softer foam when this mixture had reached a volume expansion of +300%.

Result:
The demoulded part was cut after 3 days of conditioning (50% Relative Humidity/23° C.) and density and compression force deflection (CFD) hardness (ASTM D 3574-77) was measured.

| | in soft part | in hard part |
|---|---|---|
| Density, kg/m$^3$ | 54 | 67 |
| CFD/50%, Pa | 6700 | 10600 |

EXAMPLES 2–6

Foam polyurethane articles were prepared from the following ingredients:

Polyol A (as used in Example 1).

Catalyst A-1 (Trade Name): bis(2-dimethylaminoethyl)ether, a commercially available amine catalyst for polyurethane production.

Catalyst A-4 (Trade Name): a commercially available amine catalyst for polyurethane production based on 3-dimethyl-N,N-dimethylamino propionamide.

Dabco 33LV (Trade Name): a commercial amine catalyst for polyurethane foam production based on triethylene diamine.

Cross linker 1: Quadrol (Trade Name); N,N,N',N'-tetrakis-(2-hydroxypropyl)-ethylene diamine: a diamine commercially available cross-linking agent.

Cross linker 2: a mixture of equal parts by weight of monoethylene glycol and a phenol/formaldehyde/aniline condensation product.

Silicon stabiliser 1: as used in Example 1.

In these Examples the following isocyanates were used:
ISO-0: 100% TDI 80-20
ISO-1: 80% wt TDI 80-20:20% wt MDI
ISO-20: 60% wt TDI 80-20:40% wt MDI
ISO-3: 100% MDI.

EXAMPLE 2

This Example shows the production of an article having harder and softer portions using a basic polyol and isocyanate combination giving a harder foam which is modified by the addition of a chain extender to give a softer foam.

A car seat was prepared as in Example 1. The formulations to make the harder and softer foams are given in the Table. The physical properties of the harder and softer foam portions were measured and are given in Table 2. In this and the subsequent Examples CT is the cream time of the foam in seconds. T is the rise time of the foam in seconds. In this Example the quantity of isocyanate fed when stream III, the additive, was fed to the mixer was adjusted so as to maintain the index substantially constant.

TABLE 2

|  | pbw | Additive | Stream II (a) | Stream II (b) |
|---|---|---|---|---|
| Stream I |  |  |  |  |
| Polyol A | 100 | MEG | 6.0 | — |
| Water | 2.6 | 1.4 BDO | — | 6.0 |
| Cat. A - 1 | 0.2 |  |  |  |
| Cat. A - 4 | 0.4 |  |  |  |
| Cat. Dabco 33LV | 0.4 |  |  |  |
| Silicon surfactant 1 | 1.0 |  |  |  |
| Stream II |  |  |  |  |
| ISO - 1 | 33.3 |  | 54.0 | 48.1 |
| Index | 102 |  | 106 | 106 |
|  | Hard foam |  | soft foam |  |
| CT, sec | 5 |  | 7 | 5 |
| RT, sec | 80 |  | 60 | 80 |
| , kg/m$^3$ | 51.1 |  | 42.3 | 44.9 |
| CFD, Pa | 3978 |  | 2617 | 2972 |

MEG = monoethylene glycol
BDO = butane-1, 4-diol

The formulation (Streams I and II) giving harder foam was first fed on the mixture giving the softer foam when this mixture had reached a volume expansion of +400%.

EXAMPLE 3

This Example shows the production of an polyurethane flexible foam article having softer and harder portions in which the basic polyol and isocyanate combination gives a softer foam and harder foam is obtained by changing the isocyanate used. A car seat was prepared as in Example 1.

The formulations used and the physical properties of the harder and softer foam portions are given in Table 3.

TABLE 3

| Stream I |  |  |
|---|---|---|
| Polyol A | 100 |  |
| Water | 2.6 |  |
| Cat. A - 1 | 0.2 |  |
| Cat. A - 4 | 0.4 |  |
| Cat. Dabco 33LV | 0.6 |  |
| Silicon surfactant 1 | 1.0 |  |
| Stream II |  |  |
| ISO - 1 | 33.5 | — |
| ISO - 3 | — | 48.5 |
| Index | 102 | 102 |
|  | Soft foam | hard foam |
| CT, sec | 5 | 7 |
| RT, sec | 70 | 70 |
| Density, kg/m$^3$ | 41 | 50 |
| CFD, Pa | 2987 | 8103 |

The formulation giving harder foam was first fed onto the mixture giving the softer foam when the mixture giving the softer foam had reached a volume expansion of +560%.

EXAMPLE 4

This Example shows the production of flexible foam parts of different hardness by the use of a cross-linker to give harder foam. In this Example the cross-linker was added to a previously prepared bulk polyol blend and the foam portions of different hardness were obtained by changing the polyol used. The formulation used and physical test results obtained are given in Table 4.

Note that although the polyol mixture giving harder foam is shown as being added to as a third stream in a three inlet mixer it could also have been added by switching the polyol stream in a two inlet mixer.

TABLE 4

| Polyol A | 100 | 100 |
|---|---|---|
| Water | 3.0 | 3.0 |
| Cat. A - 1 | 0.2 | 0.2 |
| Cat. A - 4 | 0.4 | 0.4 |
| Cat. Dabco 33LV | 0.5 | 0.5 |
| Silicone surfactant 1 | 1.0 | 1.0 |
| Cross-linker 2 | — | 8.0 |
| ISO - 1 | 41.9 | 53.9 |
| Index | 108 | 108 |
|  | Soft foam | hard foam |
| CT, sec | 5 | 5 |
| RT, sec | 75 | 65 |
| Density, kg/m$^3$ | 43.6 | 38.6 |
| CFD, Pa | 3771 | 5266 |

The formulation giving harder foam was first fed onto the mixture giving the softer foam when the mixture giving the softer foam had reached a volume expansion of +316%.

EXAMPLE 5

This is another Example showing the production of a flexible polyurethane foam article by variation in the composition of the isocyanate used. A foam car seat was made as in Example 1. The composition of the formulation used and the results obtained are given in Table 5.

TABLE 5

| Stream I |  |  |
|---|---|---|
| Polyol A | 100 |  |
| Water | 2.6 |  |
| Cat. A - 1 | 0.3 |  |
| Cat. A - 4 | 0.4 |  |
| Cat. Dabco 33LV | 0.5 |  |
| Silicone surfactant 1 | 1.0 |  |
| DEOA | 3.0 |  |
| Stream II |  |  |
| ISO - 0 | 43.2 | 28.1 |
| ISO - 3 | — | 18.7 |
| Index | 106 | 106 |
|  | soft foam | hard foam |
| CT, sec | 6 | 5 |
| RT, sec | 55 | 50 |
| Density, kg/m$^3$ | 54.6 | 55 |
| CFD, Pa | 4654 | 7578 |

DEOA = Diethanolamine

The formulation giving harder foam was first fed onto the mixture giving the softer foam when the mixture giving the softer foam had reached a volume expansion of 640%.

EXAMPLE 6

This shows the preparation of harder and softer polyurethane parts using a basic polyol and isocyanate stream which gives a softer foam and adjusting the hardness by adding a third stream of active hydrogen-containing compound (in this case a cross-linker which increase hardness). A car seat was prepared as in Example 1. The foam formulations used and the physical test results obtained are given in Table 6.

TABLE 6

|  |  | Stream III |  |  |  |  |
|---|---|---|---|---|---|---|
|  |  | Cross linker 1 |  | DEOA | TEOA | Cross linker 2 |
|  |  | (a) | (b) | (c) | (d) | (e) |
| Stream I |  |  |  |  |  |  |
| Polyol B | 100 |  |  |  |  |  |
| Water | 2.6 |  |  |  |  |  |
| Cross linker | — | 6.0 | 6.0 | 6.0 | 6.0 | 6.0 |
| Cat. A - 1 | 0.2 |  |  |  |  |  |
| Cat. A - 4 | 0.4 |  |  |  |  |  |
| Cat. Dabco 33LV | 0.6 |  |  |  |  |  |
| Silicone surfactant 1 | 0.1 |  |  |  |  |  |
| Stream II |  |  |  |  |  | 6.0 |
| ISO - 1 | 33.5 | 45.1 | 40.0 | 43.3 | 46.8 | 43.0 |
|  | soft foam |  |  | hard foam |  |  |
| Index | 102 | 106 | 106 | 106 | 106 | 106 |
| CT, sec | 5 | 6 | 5 | 7 | 6 | 5 |
| RT, sec | 70 | 55 | 80 | 70 | 40 | 60 |
| Density, kg/m$^3$ | 41 | 42.7 | 40.2 | 66.9 | 50.6 | 36.6 |
| CFD, Pa | 2987 | 4389 | 3817 | 5354 | 4215 | 4183 |

DEOA = Diethanol amine
TEOA = Triethanolamine

The formulation giving harder foam was first fed onto the mixture giving the softer foam when the mixture giving the softer foam had reached a volume expansion of +300%.

I claim:

1. A process for the production of a flexible polyurethane foam article with regions of different hardness, which process comprises introducing into a mould a first foam formulation and a second foam formulation, the two formulations giving foam of different hardness and prepared by mixing together a polyol stream and an isocyanate stream in a mixer
characterised in that the process comprises first introducing the first formulation to give a relatively soft foam and then introducing the second formulation to give a relatively hard foam, the second foam formulation being introduced directly on to the first formulation, at a time corresponding to a volume expansion of the first foam formulation in the range +100% to +2300% so as to form one or more relatively hard regions embedded within and surrounded by the relatively soft foam.

2. The process according to claim 1 wherein the second foam formulation is introduced at a time corresponding to a volume expansion of the first foam formulation in the range +250% to +1400%.

3. The process according to either of claims 1 or 2 wherein the second foam formulation is first introduced at a time in the range t+3 to t+15 seconds (where t is the cream time of the first formulation) after the introduction of the first foam has begun.

4. The process according to claim 3 wherein the second formulation is first introduced at a time between t+3 seconds and t+7 seconds after the introduction of the first formulation has begun.

5. The process according to claim 1 wherein regions of differing hardness are obtained by a change in the content of polyphenylmethylene isocyanate between the first and second foam formulations.

6. The process according to claim 1 wherein regions of differing hardness are obtained by a change in active hydrogen containing compounds between the first and second foam formulations.

7. The process according to claim 6 wherein the active hydrogen containing compound has an active hydrogen content corresponding to a hydroxyl number of at least 50.

8. The process according to claim 7 wherein the active hydrogen content corresponds to a hydroxyl number of 600 to 1500.

9. The process according to claim 6 wherein the quantity of active hydrogen is in the range 2 to 25 parts per 100 parts of polyol.

10. The process according to claim 1 wherein the two foam formulations are produced from a polyol stream and an isocyanate stream and one of the foam formulations is produced by adding a third stream containing an active hydrogen containing compound.

11. The process according to claim 10 wherein the active hydrogen containing compound is a chain extender.

12. The process according to claim 3 wherein the first foam formulation has a cream time of 2 to 7 seconds.

13. The process according to claim 1, wherein regions of differing hardness are obtained by a change in the content of a chain extender between the first and second foam formulations.

14. The process according to claim 1, wherein regions of differing hardness are obtained by a change in the composition of the isocyanate between the first and second foam formulations.

15. The process according to claim 1, wherein regions of differing hardness are obtained by a change in the content of a cross-linker between the first and second foam formulations.

16. The process according to claim 1, wherein said first foam has not solidified before said second foam is added.

17. A process for the production of a flexible polyurethane foam article with regions of different hardness, which process comprises introducing into a mould a first foam formulation and a second foam formulation, the two formulations giving foam of different hardness and prepared by mixing together a polyol stream and an isocyanate stream in a mixer,
characterised in that the process comprises first introducing the first formulation to give a relatively soft foam and then introducing the second formulation to give a relatively hard foam, the second foam formulation being introduced directly on to a portion of the first formulation, at a time corresponding to a volume expansion of the first foam formulation in the range +100% to +2300%, said time of said volume expansion of said first foam formulation occurring in at least the cream stage but before the tacky stage, the second foam formulation settling within a cavity in the first foam formulation, the first foam formulation foaming, and continuing to foam, and to expand at a rate greater than the rate of foaming expansion of the second foaming formulation, so that the first foaming formulation flows over and around the second foaming formulation, so as to form one or more relatively hard regions embedded within and surrounded by the relatively soft foam.

* * * * *